July 14, 1942.  J. HICKEY  2,289,362
PARKING INDICATOR
Filed Oct. 28, 1940  2 Sheets-Sheet 1

Inventor
James Hickey
By T. J. Geisler
and F. R. Geisler
Attorneys

July 14, 1942.  J. HICKEY  2,289,362
PARKING INDICATOR
Filed Oct. 28, 1940    2 Sheets-Sheet 2
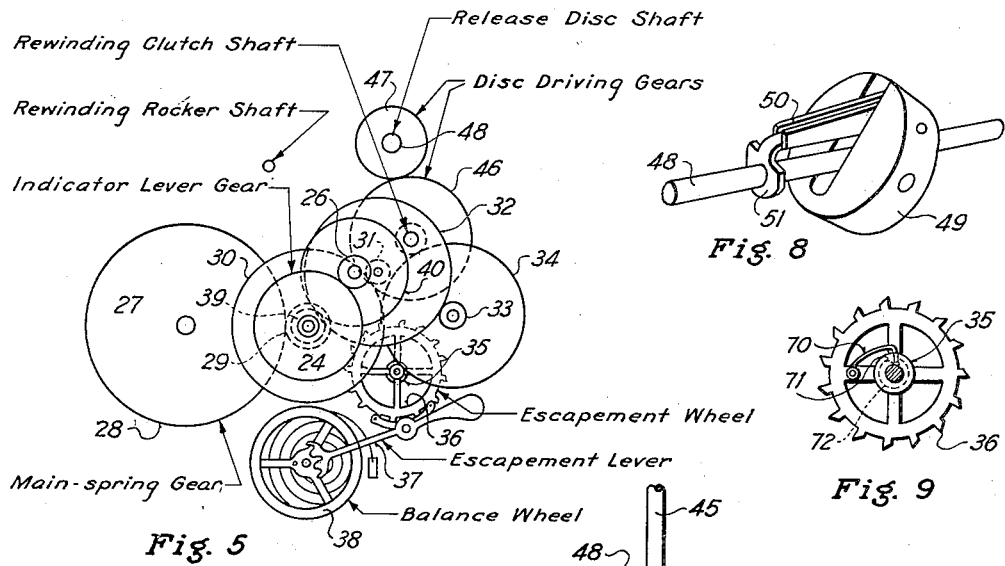
Fig. 5
Fig. 8
Fig. 9
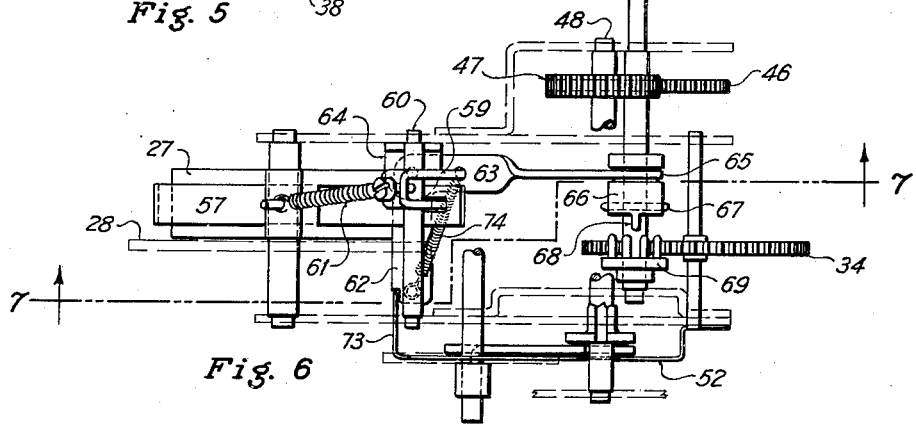
Fig. 6
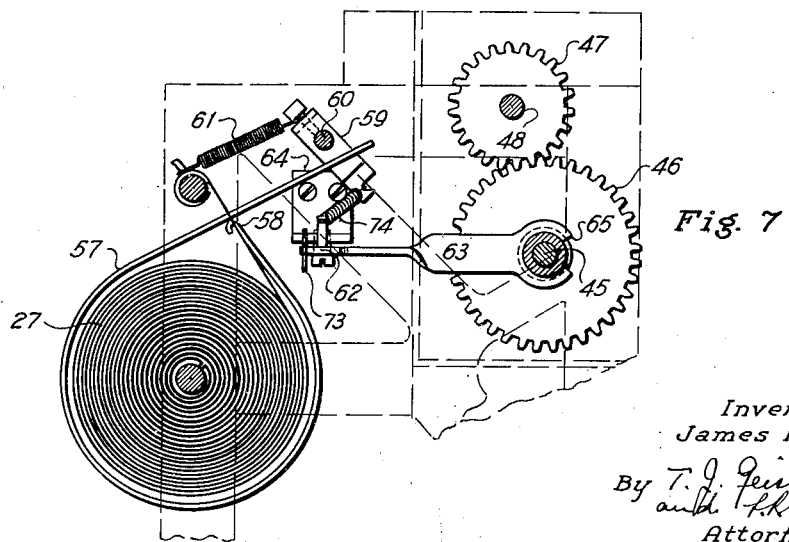
Fig. 7
Inventor
James Hickey
By T. J. Geisler
and F. R. Geisler
Attorneys Patented July 14, 1942

2,289,362

UNITED STATES PATENT OFFICE 2,289,362

PARKING INDICATOR

James Hickey, Portland, Oreg.

Application October 28, 1940, Serial No. 363,165

12 Claims. (Cl. 161—15)

This invention relates to parking time indicators, and, in particular, to means, carried on a vehicle, for the purpose of indicating the length of time during which the vehicle has been parked in the same location.

With the increase in the number of automotive vehicles and the resulting parking problem which has become a more and more serious one in most localities, the necessity for regulating the length of time during which a vehicle may remain parked in the same location, for example, at the curb, has become quite urgent. To meet this necessity some cities have installed so-called "parking meters" along the curb or sidewalk of the principal thoroughfares. This invention however is concerned with a "parking meter" or parking time indicator which is carried on the vehicle itself, distinguishing from the usual type of parking meter which is entirely separated from the vehicle.

An object of this invention is to provide such an indicator on the vehicle which will be automatic in operation and which will function only when the vehicle is standing still or parked.

Another object of this invention is to provide a time indicator on the vehicle which will be entirely removed from the control of the operator of the vehicle and which can be reset ordinarily only by moving the vehicle.

A further object of this invention is to provide a time indicator which will be simple, ornamental, and inexpensive to build and install, and which will be suitable for installation in any type of automotive vehicle.

These and incidental objects I attain in my invention by providing such a time indicator, the indicating means for which is mounted on the outside of the vehicle, but which is driven from a clock mechanism installed within the vehicle and which is also inaccessible to the driver of the vehicle; and by controlling the running of the clock mechanism, including the rewinding of the actuating spring for such clock mechanism, automatically through the operation of a cable attached to the speedometer drive of the vehicle; and by otherwise constructing and arranging the various parts and controls of my device in the manner hereinafter described with reference to the accompanying drawings.

In the drawings:

Figure 5 is a diagram showing the relationship of the gear trains of the clockwork mechanism;

Figure 6 is an enlarged side elevation of the mechanism which automatically controls the winding of the spring that motivates the clockwork;

Figure 7 is a section on the line 7—7 of Figure 6 looking in the direction indicated by the arrows;

Figure 8 is a perspective view of the governer that controls the operation of the clockwork mechanism; and Figure 9 is a detail view of the escapement wheel of the clock mechanism.

Figure 1:
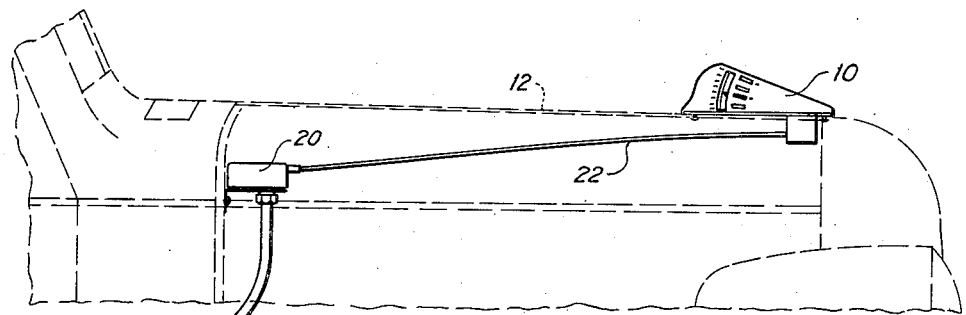
Figure 1 is a schematic side elevational view of my parking indicator assembly in preferred position on the forward portion of an automotive vehicle which portion is shown in broken outline.
Figure 2:
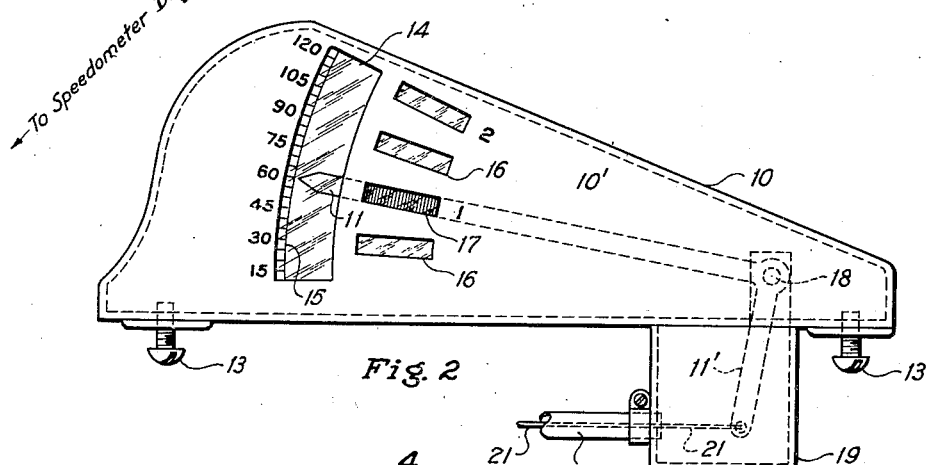
Figure 2 is an enlarged side elevation of the indicator proper.

With reference first to Figures 1 and 2, the indicator proper comprises an ornamental hollow metal head 10 and a pointer 11 pivotally disposed therein for vertical arcuate movement. The shape of the hollow metal head 10 may be varied to suit the particular design of the automotive vehicle upon which the indicator is to be mounted but may conveniently be made in the modified triangular shape shown and attached to the forward portion of the hood 12 of the vehicle by means of screws 13, 13 or other suitable fastening devices. The parallel sides 10' of the indicator head are identical and each side is formed with an aperture 14 shaped to correspond with the curvilinear course traversed by the pointer 11 when in operation, and so disposed that the position of the said pointer is visible at all times from either side of the vehicle, the said apertures 14 being covered on the inside of the hollow head with transparent material such as glass or Celluloid. A curved scale 15 centrally disposed in the head and visible through the apertures 14 is graduated in any desired manner, for example, in five minute intervals beginning with fifteen minutes and extending to one hundred twenty minutes or two hours, this being the maximum parking period permitted in most towns and cities. Numerals may be stamped or otherwise imprinted on the metal head 10 adjacent the graduated scale 15 to indicate fifteen minute periods as shown in Figure 2. As a further indication of elapsed time, a series of rectangular windows 16 is provided and so disposed that a colored section 17 of the pointer 11 will register with the windows at half-hour intervals as the said pointer ascends on its arcuate course and as its pointed end registers with the appropriate numbered graduations. A numeral "1" may be imprinted on the head adjacent the second rectangular window to designate the one hour period and a numeral "2" adjacent the fourth and uppermost window to indicate the two hour period.

The pointer 11 is preferably made in the form of a bell-crank pivotally mounted in the head as at 18 and having its downwardly extended arm 11', enclosed in a box-like housing 19 formed as part of the head 10. The bell-crank pointer 11 is connected to the motivating clockwork mechanism contained in the case 20 (Figure 1) by means of a stiff wire 21 which extends from the pointer arm 11' through a suitable tube 22 to an arm 23 (Figure 3) attached to a gear 24 of the clockwork, the tube 22 being made fast to the housing 19 and to the clock case 20 in any suitable manner to allow the wire 21 free movement within the stationary tube.

Figure 3:
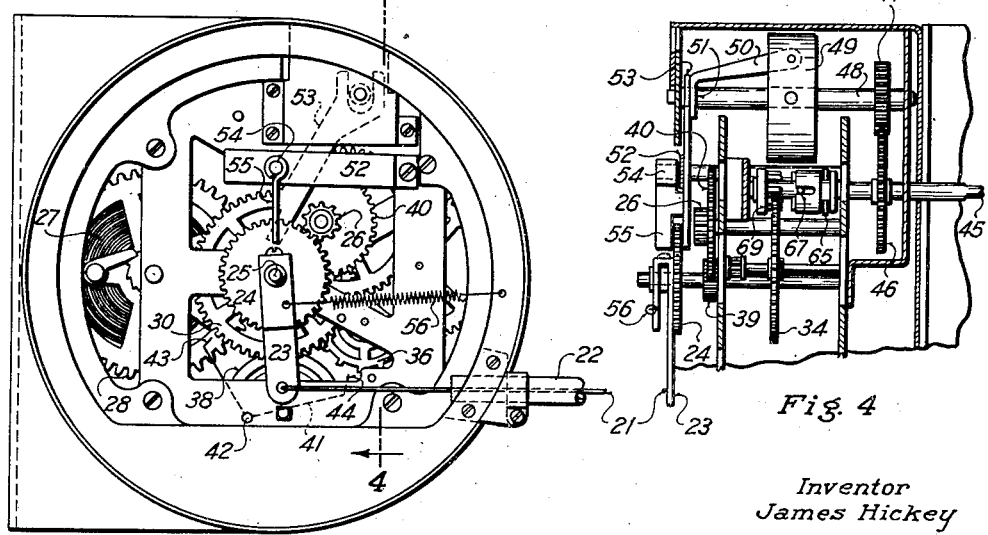
Figure 3 is a plan view, with the cover removed, of the clockwork mechanism for operating the indicator.

The arm 23, to which the wire is attached, and its actuating gear 24 are operative only when the automotive vehicle is not in motion and are then caused to move in clockwise arcs, as viewed in Figure 3, by the operation of the spring-driven clockwork mechanism which runs constantly except when being automatically rewound by certain devices to be presently described. When the vehicle is not in motion, the gear 24, which is slidably disposed for free rotation on a shaft 25, lies in engagement with a pinion 26 which is an element of the clock mechanism shown diagrammatically in Figure 5, this mechanism consisting of the usual gear train and escapement actuated by a coil spring 27. The expansion of the wound coil spring is effective to rotate the associated gear 28 and, by virtue of pinion 29, gear 30, pinion 31, gear 32, pinion 33, gear 34, pinion 35, escapement wheel 36, escapement lever 37 and balance wheel 38, and pinion 39 (which is fixed to the same shaft as gear 30) engaging the gear 40, to cause driving rotation of the said pinion 26 which is made fast to the gear 40. This arrangement is a standard clock movement with the usual hour and minute hands and associated gears removed. The axially slidable gear 24, to which the arm 23 is attached, replaces the conventional minute hand gear and any suitable movement or mechanism similar to that described above may be employed to impart driving rotation to the pinion 26 which, during the period that the vehicle is parked, drives the gear 24 and causes clockwise arcuate movement of the arm 23 and corresponding arcuate travel of the pointer 11.

The length of the pointer 11 is so proportioned to the lengths of the arms 11' and 23 that the gear 24 is required to make only about one half of one revolution in order to raise the indicating end of the pointer through the entire range of the graduated scale 15, and the gear 24 is so coordinated with the driving train of gears of the clock mechanism that the rate of movement of the pointer will coincide with the time intervals denoted by the graduations. When the pointer reaches the top of the scale (in this case at the 120 minute graduation), the clock mechanism is caused to stop by a wire 41 (Figure 3) that is made in the form of a bell-crank and pivotally mounted on the clock frame as at 42. One arm of this wire crank has its extremity 43 bent at right angles to form a bar which is placed in the path of the ascending arm 23 so that when the arm 23 reaches the point in its arcuate travel that corresponds to the upper limit of movement of the pointer 11, the arm 23 will engage the bent end 43 of the wire crank and cause the opposite end 44 of the wire, which is also bent at right angles, to engage the teeth of the escapement wheel 36 and thus prevent further operation of the clock mechanism until this lock is released by movement in the opposite direction of the arm 23, as when the pointer 11 is returned to the base of the scale 15. This return is caused to occur automatically immediately the vehicle is moved under its own power by the operation of mechanism which shifts the gear 24 out of mesh with the driving pinion 26. A shaft 45 (Figure 4) is connected in any suitable manner to the usual speedometer drive of the vehicle so that the rotary motion of the said speedometer drive, which is produced whenever the vehicle is driven or the drive shaft of the vehicle rotated, is transmitted to the said shaft 45 as well as to the speedometer mechanism. Keyed to the shaft 45 is a gear 46 which meshes with a pinion 47, made fast to a parallel shaft 48, and on this shaft is pivotally disposed a comparatively heavy metal disc 49. This disc 49 is slotted as shown in Figure 8 and one end of an arm 50 is pivotally mounted therein. The other end of arm 50 is bent downwardly as at 51 to form a collar arranged to slide freely on the shaft 48. When the shaft 45 and consequently the shaft 48, are at rest, the disc 49 and arm 50 are caused to assume the position shown in Figure 8 by a leaf spring 52 (Figures 3 and 4) which has one end made fast to the clock frame and which exerts resilient pressure against a shifting lever 53, the top end of which is a yoke that in turn exerts pressure on the slide collar 51 of the disc arm 50. An integral portion of the shifting lever 53 is bent normal to the plane of the lever and is formed into a hub 54 and a bracket 55. The hub 54 is rockably disposed on a suitable pivot. The main portion of the lever 53 extends for a short distance behind the gear 24 (Figure 4) and the bracket 55 extends over the other face of the gear 24, the lever 53 thus forming a fork in which the gear 24 may freely rotate.

As previously explained, the heavy disc 49 lies in an oblique position with respect to its supporting shaft 48 and the gear 24 engages the pinion 26 when the vehicle is at rest. However, when the vehicle is set in motion and the shaft 45 is consequently rotated by the speedometer drive, the accelerated rotation of the shaft 48 will cause the disc 49 to gradually assume a plane of rotation normal to the axis of its shaft due to centrifugal force and the arm 50 will be slid axially on the shaft 48 against the slight resisting force of the leaf spring 52. Since the collar portion 51 of the arm 50 bears on the shifting lever 53 the latter will thrust the gear 24 out of engagement with the pinion 26, the affected parts being then in the position shown in Figure 4. Coincident with the release of the gear 24 from engagement with the driving pinion 26, the arm 23 (Figure 3) will be swung in a counter-clockwise arc by an extension spring 56, which action relieves the tension on the wire 21 and allows the pointer 11 to descend to the base of the scale 15 where it will remain at rest so long as the gear 24 is held out of mesh with the pinion 26 by the rotation of the shaft 45, or, in other words, so long as the vehicle is in motion.

If the arm 23 has reached the upper limit of travel prior to the described return movement, and the clock mechanism has thus been rendered inoperative by the locking wire 41, the return motion of the arm 23 will release the said wire from engagement with the teeth of the escapement wheel and the normal vibration of the vehicle will place the spring driven clock mechanism in motion. If, however, the arm 23 is returned from any other position, the operation of the clock mechanism continues without interruption. It may therefore be stated that the clock mechanism that motivates the pointer operates practically independently thereof and that its operation is continuous except when stopped as the pointer reaches its limit of movement as previously explained and except during the rewinding process.

The rewinding process is automatically caused to commence when the spring 27 has expanded to its practical limit. An encompassing metal band 57 (see Figures 6 and 7), has one end hooked into the spring as shown at 58 in Figure 7 and the other end is passed through a slot in the spring and is itself slotted to receive in free engagement an inverted U-shaped lever 59 which is rockably disposed on a shaft 60 and normally held in the position shown by an extension spring 61. At the hooked lower end of one of the legs of this U-shaped lever 59 a spring 74 connects the said lever with the short arm 62 of a bell-crank 63 pivotally mounted on a bracket 64, the long arm of this crank 63 being bifurcated as at 65 to straddle the shaft 45 and bear against a dental clutch disc 66 (Figure 6) slidably disposed on the said shaft. The clutch disc 66 is prevented from rotation independently of the shaft 45 by a pin 67 made fast in the shaft and extended into slots in the disc, the slots permitting axial movement of the clutch disc with respect to the shaft and pin. The face of the clutch disc is provided with dental projections 68 adapted to mesh with a pin gear 69 when brought into engagement therewith, the pin gear being always in mesh with the gear 34, which is an element of the clock gear train, but freely disposed on shaft 45 (Figures 4 and 6).

Figure 4:
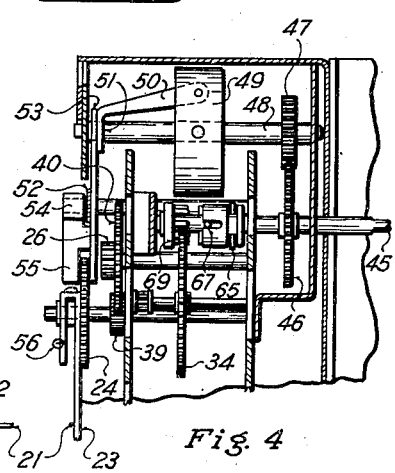
Figure 4 is a corresponding sectional elevation taken on line 4—4 of Figure 3.

In Figures 4 and 7, the rewinding control mechanism is shown in inoperative position but it will be apparent that as the spring 27 expands, its energy being used for driving the clock mechanism, the encompassing band 57 will be correspondingly expanded and will cause the U-shaped lever 59 to move in a clockwise arc on its pivot 60 against the force of the spring 61. When the expansion of the spring 27 reaches a predetermined extent, the lever 59 will have moved sufficiently to cause the spring 74 to pull the short arm 62 of the bell-crank shifting fork 63 in a clockwise arc (as viewed in Figure 6), and cause the fork 65 to thrust the clutch disc 66 into engagement with pin gear 69 and, since this idling pin gear is meshed with the gear 34, the shaft 45 will then be connected to the main spring gear 28 of the clock mechanism via gear 34, pinion 33, gear 32, pinion 31, gear 30, and pinion 29. Thus, the driving rotation imparted to the shaft 45 by the speedometer drive of the moving vehicle, will be effective to wind the spring whenever required, the motion of the gear train being of course in the opposite direction to that in which it normally runs while functioning as the motivating medium for the time recording pointer 11.

This reversal of movement of the clock mechanism necessitates provision being made to render the escapement inoperative during the rewinding process because it is neither practical nor advisable to reverse the somewhat delicate mechanism. In order to accomplish this, the escapement wheel 36 is freely disposed on the shaft of the pinion 35 and is provided with a wire pawl 70 (Figure 9) the bent end of which registers with a recess formed in the hub of the pinion 35 and so acts as a couple between the driven pinion and the escapement wheel during normal operation of the clock. The said pinion hub recess, however, is beveled on one side 71 so that when the pinion 35 is rotated in the opposite direction the pawl will leave the recess and thus disconnect the escapement wheel from the pinion, the pawl then merely riding in a peripheral groove 72 in the hub and the escapement wheel remaining stationary while the pinion shaft rotates within its hub.

When the spring 27 has been tightly rewound, the band 57 will have contracted sufficiently to permit the spring 61 to retract the lever 59 and cause the snap-over spring 74 to actuate the bell-crank shift fork and disengage the clutch disc 66.

As a safeguard against the possibility of the rewinding control mechanism being operated while the pointer gear 24 is in mesh with the pinion 26, the free end of the leaf spring 52 is bent at right angles as at 73 in Figure 6 to register with a notch in the short arm of the bell-crank shift lever 63 when the pointer gear 24 is engaged. The shift lever 63 is therefore prevented from being actuated to throw in the rewinding clutch until the leaf spring 52 has been thrust outwardly by the operation of the control disc 49 and has disengaged the gear 24 from the driving pinion 26.

I claim:

1. In a device of the character described, a movable indicator, a clockwork mechanism, means operated by said clockwork mechanism and connected with said movable indicator for moving said indicator, a speedometer drive and means connected thereto adapted to disconnect said clockwork operated means from said clockwork mechanism whenever the speedometer is in motion, a coil spring for said clockwork mechanism, a winding gear for said coil spring, a clutch connecting said winding gear to said speedometer drive connected means, an automatic control for said clutch operated by the expansion of said coil spring, whereby the unwinding and consequent expansion of said coil spring will cause said clutch to move into engaging position and the winding and consequent contraction of said coil spring will cause said clutch to move out of engaging position, means for preventing the operation of said control and said clutch and thereby the winding of said coil spring when said clockwork operated means is connected to said clockwork mechanism, and an engaging element for stopping the running of said clockwork mechanism whenever said clockwork operated means has reached a predetermined limit of movement in one direction.

2. In a device of the character described, a movable indicator, a clockwork mechanism, a lever arm operated by said clockwork mechanism, said lever arm connected with said movable indicator, a speedometer drive and means connected thereto adapted to disconnect said lever arm from said clockwork mechanism whenever the speedometer drive is in motion, and an engaging element associated with said clockwork mechanism for stopping the running of said clockwork mechanism, said element arranged so as to be actuated by said lever arm, whenever said lever arm has reached a predetermined limit of movement in one direction.

3. In a device of the character described, a movable indicator, a clockwork mechanism, a lever arm normally connected to said clockwork mechanism, said lever arm operating said movable indicator, a speedometer drive and means connected thereto adapted to disconnect said lever arm from said clockwork mechanism whenever the speedometer drive is in motion, a coil spring operating said clockwork mechanism, automatic means for winding said coil spring, said automatic means including a winding gear, a clutch connecting said winding gear to said first-mentioned means and thereby to said speedometer drive and, an automatic control for said clutch operated by the expansion and contraction of said coil spring, whereby the unwinding and consequent expansion of said coil spring will cause said clutch to move into engaging position to produce winding of said spring and the winding and consequent contraction of said coil spring will cause said clutch to move out of engaging position and prevent further winding temporarily.

4. The combination set forth in claim 3 with the addition of means for preventing the operation of said control and said clutch and thereby the winding of said coil spring when said lever arm is connected to said clockwork mechanism.

5. The combination set forth in claim 3 with an escapement having an escapement wheel in said clockwork mechanism and a member associated with said escapement for preventing reverse operation of said escapement during the winding of the coil spring.

6. In a vehicle parking indicator, a movable time indicating arm, a clockwork mechanism, means operated by said clockwork mechanism and connected with said movable time indicating arm for moving said time indicating arm, a stop arm for stopping the running of said clockwork mechanism whenever said clockwork operated means and therewith said time-indicating arm have reached a predetermined limit of movement in one direction, a speedometer drive, means associated with said speedometer drive adapted to disconnect said clockwork operated means from said clockwork mechanism whenever the speedometer drive is in motion, a coil spring operating said clockwork mechanism, automatic means for winding said coil spring, said automatic means including a winding gear, clutch means connecting said winding gear to said speedometer drive associated means, and an automatic control for said clutch means operated by the expansion and contraction of said coil spring, whereby the unwinding and consequent expansion of said coil spring will cause said clutch means to move into engaging position to produce winding of said spring, and the winding and consequent contraction of said coil spring will cause said clutch means to move out of engaging position and prevent further winding temporarily.

7. The combination set forth in claim 6 with the addition of means for preventing the operation of said control and said clutch means and thereby the winding of said coil spring when said clockwork operated means is connected to said clockwork mechanism.

8. In a vehicle, a movable indicating member, a clockwork mechanism, means operated by said clockwork mechanism and connected with said movable indicating member for moving said indicating member, a speedometer drive, means associated with said speedometer drive adapted to disconnect said clockwork operated means from said clockwork mechanism whenever the speedometer drive is in motion, a coil spring for said clockwork mechanism, a winding gear for said coil spring, clutch means adapted to connect said winding gear to said speedometer drive associated means, an automatic control for said clutch means operated by the expansion of said coil spring, whereby the unwinding and consequent expansion of said coil spring will cause said clutch means to move into engaging position and the winding and consequent contraction of said coil spring will cause said clutch means to move out of engaging position, and means preventing the operation of said control and said clutch means, and therewith the winding of said coil spring, when said clockwork operated means is connected to said clockwork mechanism.

9. In a vehicle, a movable indicating member, a clockwork mechanism, means operated by said clockwork mechanism and connected with said movable indicating member for moving said indicating member, a speedometer drive, means associated with said speedometer drive adapted to disconnect said clockwork operated means from said clockwork mechanism whenever the speedometer drive is in motion, a coil spring for said clockwork mechanism, a winding gear for said coil spring, clutch means adapted to connect said winding gear to said speedometer drive associated means, an automatic control for said clutch means operated by the expansion of said coil spring, whereby the unwinding and consequent expansion of said coil spring will cause said clutch means to move into engaging position and the winding and consequent contraction of said coil spring will cause said clutch means to move out of engaging position, and an escapement in said clock mechanism and means for preventing reverse operation of said escapement during the winding of the coil spring.

10. In a vehicle, a parking indicator of the character described, including a movable indicating member mounted on the outside of the vehicle, a clockwork mechanism located on the inside of the vehicle, a spring for operating said clockwork mechanism, said indicating member normally connected to said clockwork mechanism, a speedometer drive in said vehicle, means operated by said speedometer drive for disconnecting said indicating member from said clockwork mechanism whenever said vehicle is in motion, means associated with said indicating member for stopping the operation of said clockwork mechanism while said vehicle is not in motion when said indicating member has reached a predetermined position, but permitting operation of said clockwork mechanism to be resumed as soon as said indicator member is returned to normal position by the movement of said vehicle, and means operated by said speedometer drive for winding said spring when the vehicle is in motion.

11. In a vehicle, a parking indicator of the character described, including a movable indicating member mounted on the outside of the vehicle, a clockwork mechanism located on the inside of the vehicle, a spring for operating said clockwork mechanism, said indicating member normally connected to said clockwork mechanism, a speedometer drive in said vehicle, means operated by said speedometer drive for disconnecting said indicating member from said clockwork mechanism whenever said vehicle is in motion, means limiting the length of the period of operation of said clockwork mechanism when said vehicle is not in motion, means connected with said speedometer drive for winding said spring, means preventing the winding of said spring when said indicating member is connected to said clockwork mechanism.

12. In a vehicle, a parking indicator of the character described, including a movable indicating member visible from the outside of the vehicle, a clockwork mechanism located on the inside of the vehicle, a spring for operating said clockwork mechanism, said indicating member normally connected to said clockwork mechanism, a speedometer drive in said vehicle, means operated by said speedometer drive for disconnecting said indicating member from said clockwork mechanism whenever said vehicle is in motion, means limiting the length of the period of operation of said clockwork mechanism when said vehicle is not in motion, means connected with said speedometer drive for winding said spring, an escapement in said clockwork mechanism and means for preventing reverse operation of said escapement during the winding of said spring.

JAMES HICKEY.